United States Patent [19]

Stapleton

[11] Patent Number: 4,842,176
[45] Date of Patent: Jun. 27, 1989

[54] LOAD-BEARING SLAT FOR VEHICLE LUGGAGE CARRIERS

[75] Inventor: Craig Stapleton, Port Huron, Mich.

[73] Assignee: Huron/St. Clair Co., a Division of Masco Industries, Inc., Port Huron, Mich.

[21] Appl. No.: 110,039

[22] Filed: Oct. 13, 1987

Related U.S. Application Data

[63] Continuation of Ser. No. 874,715, Jun. 16, 1986, abandoned.

[51] Int. Cl.$^4$ .............................................. B60R 9/04
[52] U.S. Cl. .................................................... 224/326
[58] Field of Search ................ 224/327, 326, 325, 309

[56] References Cited

U.S. PATENT DOCUMENTS

| | | | |
|---|---|---|---|
| 3,519,179 | 7/1970 | Stephen | 224/326 |
| 3,615,069 | 10/1971 | Bott | 224/309 |
| 3,997,208 | 12/1976 | Nomiyama | 293/142 X |
| 4,265,383 | 5/1981 | Ferguson | 224/326 |
| 4,501,386 | 2/1985 | Razor et al. | 224/326 |

*Primary Examiner*—Renee S. Luebke
*Attorney, Agent, or Firm*—Edgar A. Zarins; Malcolm L. Sutherland; Leon E. Redman

[57] ABSTRACT

A longitudinal slat which forms the load-bearing surface of a vehicle mounted luggage carrier. The slat includes an elongated channel member which is fixedly secured to the surface of the vehicle and a rub strip mounted to the channel member which supports the cargo and prevents exposure to the channel member. The channel member includes a perpendicular retaining shoulder disposed inwardly from and forming an extension of the side walls of the channel member. These retaining shoulders cooperate with horizontal grooves formed in opposite sides of the rub strip to prevent vertical displacement of the rub strip relative to the top opening of the channel member. Thus, the rub strip is fixedly retained within the opening by the perpendicular shoulders.

10 Claims, 1 Drawing Sheet

LOAD-BEARING SLAT FOR VEHICLE LUGGAGE CARRIERS

This is a continuation of co-pending application Ser. No. 874,715 filed on June 16, 1986 and now abandoned.

BACKGROUND OF THE INVENTION

I. Field of the Invention

This invention relates to vehicle mounted luggage carriers and, in particular, to a construction for a slat which forms the load-bearing surface of the luggage rack.

II. Description of the Prior Art

Longitudinal load-bearing slats have been widely utilized to form the support surface of a vehicle luggage carrier. Generally, these slats are mounted flush with the surface of the vehicle and extend longitudinally to minimize wind resistance. Many of the past known slats are constructed of stainless steel and secured to the vehicle by a series of mounting screws. However, it has been found that the full stainless steel construction can cause damage to luggage and the like from the frictional rubbing between the slat and cargo. In addition, movement of the luggage can cause damage to the slat itself.

In order to overcome this, a rub strip was added to the stainless steel slat to protect the cargo from damage. This rub strip is generally made of a rubber or plastic material and is mounted to the top of the slat. In a known embodiment, the stainless steel slat is formed by a channel member having an elongated opening on its top face. This channel member is secured to the vehicle surface by mounting screws disposed within the channel member. Once mounted, the rub strip is placed within the top opening of the channel member to form the load-bearing surface of the luggage carrier. However, in order to facilitate assembly of the slat, the rub strip has a substantially wedge-shaped cross section which interacts with a downwardly angled extension of the side walls of the channel member to maintain the position of the rub strip in the opening of the channel member. In this position, an upper surface of the rub strip extends above the channel member.

Despite the ease of assembly provided by the wedge-shaped rub strip and the inwardly angled walls of the channel member, the rub strip has a tendency to be pushed down inside the channel member under heavy loads. Thus, when heavier luggage is placed upon the slats, the load can expose the top surface of the stainless steel channel member to the luggage causing damage to both the luggage and the support slat. Moreover, under extreme loads portions of the rub strip may be pushed completely within the channel member requiring removal of the entire strip or specialized tools for removal of the vertically displaced portion.

SUMMARY OF THE PRESENT INVENTION

The present invention overcomes the disadvantages of the prior known load-bearing slats by providing a slat construction which eliminates the vertical displacement of the rub strip relative to the channel member.

The slat according to the present invention includes an elongated channel member mounted to an exterior surface of the vehicle and to which is mounted an elongated rub strip which is fixedly retained within the channel member. The channel member is preferably constructed of stainless steel and includes opposing side walls which define a top opening of the channel member. Retaining shoulders which form an extension of these side walls are disposed inwardly from the walls. These retaining shoulders are formed by two perpendicular portions, one of which extends downwardly from the top of the side wall and the other of which extends horizontally inwardly from the first portion. Thus, these two portions form a perpendicular retaining shoulder regardless of the overall shape of the channel member.

The rubber or plastic rub strip, which is mounted within the top opening of the channel member, includes a wedge-shaped lower portion and vertical side walls extending upwardly from the lower portion. The tapered lower portion of the strip facilitates assembly of the strip within the channel. Formed in the side walls of the strip are horizontal grooves which extend substantially the length of the strip and cooperatingly engage the inwardly extending portion of the retaining shoulder. The interaction of the inwardly extending flanges with the horizontal grooves positively locks the strip into the channel member. With the rub strip mounted in the top opening of the channel member, the upper portion of the strip extends above the stainless steel channel member to prevent contact between the cargo and the steel channel member.

Thus, the present invention provides a simple and convenient construction for a longitudinal slat of a luggage carrier which is easy to assemble yet is not subject to vertical displacement of the rub strip under heavy loads.

Other objects, features, and advantages of the present invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views, and in which.

DETAILED DESCRIPTION OF A PREFERRED EMBODIMENT OF THE PRESENT INVENTION

Figure 1:
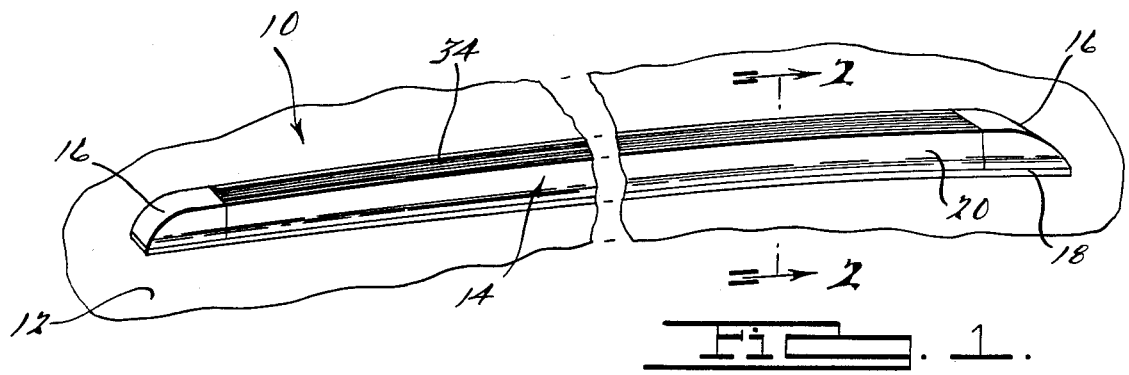
FIG. 1 is an elevated perspective of one of the load-bearing slats embodying the present invention.

Referring first to FIG. 1, a load-bearing slat 10 embodying the present invention is thereshown. The slat 10 is adapted to be mounted to the exterior surface 12 of a motor vehicle in order to form a luggage carrier or rack. The slats 10 which form the luggage rack may be mounted to the rooftop of the vehicle or a rear deck in either a longitudinal or transverse alignment. As with conventional load-bearing slats, the slat 10 of the present invention generally comprises an elongated longitudinal 14 and end caps 16 secured to the ends of the longitudinal 14. In order to protect the surface 12 of the vehicle from premature corrosion, a protector strip 18 is disposed between the slat 10 and the vehicle surface 12.

Figure 2:
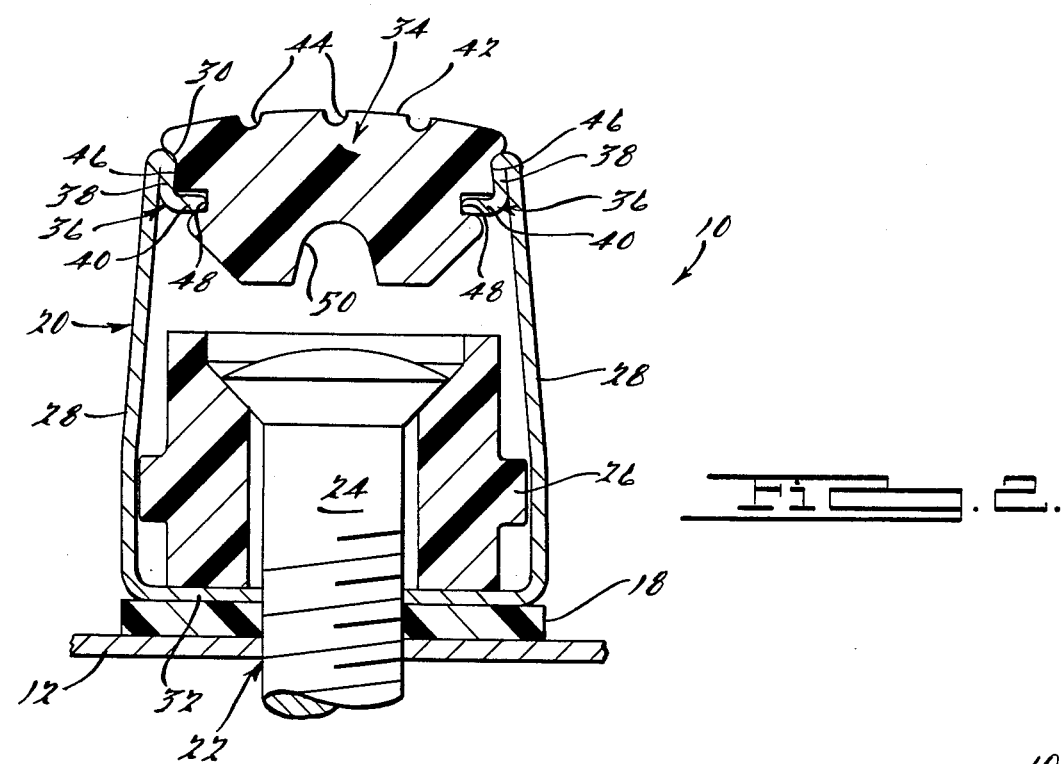
FIG. 2 is a cross-sectional perspective of a preferred embodiment of the present invention taken along line 2—2 of FIG. 1.

Referring now to FIGS. 1 and 2, the longitudinal 14 of the slat 10 includes an elongated channel member 20 mounted to the vehicle surface 12 by securing means 22.

In the preferred embodiment, the channel member 20 is secured to the vehicle by a plurality of screws 24 spaced along the channel member 20 and disposed within a support member 26 which enhances the structural strength of the slat 10. An example of such a fastening assembly is disclosed in U.S. Pat. No. 4,501,386. Alternatively, the channel member 20 may be secured to the vehicle surface 12 in any manner which provides secure positioning of the slat 10, including rivets or adhesives.

The channel member 20 includes a pair of side walls 28, which define an elongated top opening 30, and a bottom wall 32. Disposed within the top opening 30 is an elongated rub strip 34 which is mounted within the opening 30 to prevent direct contact between the cargo and the metal channel member 20. Preferably, the rub strip 34 is made of rubber or plastic although any material may be utilized which provides the necessary flexibility and strength yet will not damage cargo placed on the slat 10.

Integrally formed with the side walls 28 of the channel member 20 are retaining shoulders 36 which prevent the vertical displacement of the rub strip 34 through the opening 30. These retaining shoulders 36 are disposed inwardly from the side walls 28 and are preferably merely an extension of the side walls 28. Each of the retaining shoulders 36 are formed by a downwardly depending portion 38 disposed inwardly from the wall 20 and a flange portion 40 extending horizontally inwardly from and perpendicular to the downwardly depending portion 38. As has been noted, in the preferred embodiment, the downwardly depending portion 38 and the inwardly extending flange 40 are an extension of the respective side wall 20.

The rub strip 34, which is fixedly retained within the top opening 30 of the channel member 20, has an arched top surface 42 upon which the cargo rests. The top surface 42 includes a plurality of grooves 44 which enhance the frictional engagement between the rub strip 34 and any cargo. Formed in the vertical side walls 46 of the rub strip 34 are opposing horizontal grooves 48 which extend substantially the entire length of the rub strip 34. These grooves 48 are adapted to receive the inwardly extending flanges 40 of the retaining shoulders 36 as will be subsequently described. Finally, the lower portion of the rub strip 34 includes a compression groove 50 which facilitates insertion of the rub strip 34 by permitting compression of the lower portion of the strip 34.

Figure 3:
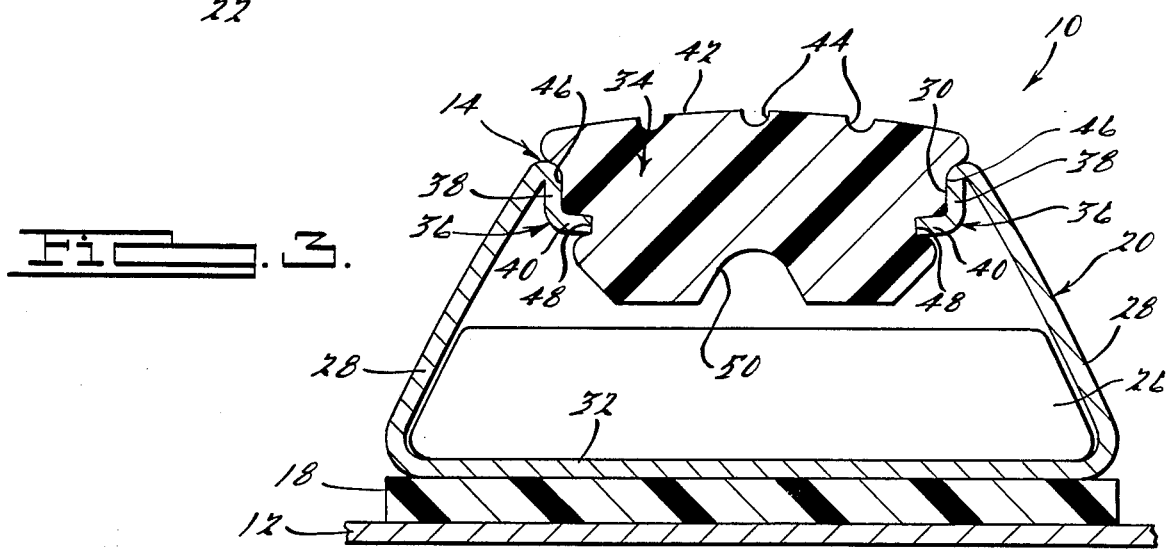
FIG. 3 is a cross-sectional perspective of an alternate embodiment of the present invention.

The alternative embodiment of the present invention shown in FIG. 3 utilizes substantially the same components. However, a wider channel member 20 is utilized to broaden the support base of the slat 10 such that greater loads can be supported thereon. Thus, the side walls 28 of the channel member 20 have a substantial slope while the bottom wall 32 is significantly wider than the bottom wall of the embodiment shown in FIGS. 1 and 2. Despite this difference in configuration, the retaining shoulders 36 remain substantially perpendicular to the vehicle surface with the portions 38 extending downwardly from the top of the walls 28 and the flanges 40 extending horizontally inwardly from and perpendicular to the first portions 38. As with the embodiment shown in FIGS. 1 and 2, the inwardly extending flanges 40 cooperate with the horizontal groove 48 of the rub strip 34 to prevent vertical displacement of the rub strip 34 through the opening 30 of the channel member 20.

Referring now to FIGS. 2 and 3, the configuration of the rub strip 34 facilitates assembly of the slat 10 while also preventing vertical displacement thereof once assembled. The channel member 20 is first secured to the vehicle surface 12 by the securing means 22. Alignment and access to the securing means 22 is readily accomplished since the top opening 30 of the channel member 20 is exposed. Once proper positioning is accomplished, the rub strip 34 may be mounted within the top opening 30 of the channel member 20. In order to insert the rub strip 34, the strip 34 is first placed on top of the channel member 20 with the lower portion of the rub strip extending partially into the opening 30. Thereafter, the rub strip 34 is forced into the channel member 20 utilizing a mallet or similar tool. As the rub strip 34 is displaced downwardly, the retaining shoulders 36 of the channel member 20 cause the lower portion of the rub strip 34 to compress inwardly about the compression groove 50 until the flanges 40 of the retaining shoulders 36 engage the opposing horizontal grooves 48. In this position, the top surface 42 of the rub strip 34 extends completely across the channel member 20 to prevent any cargo placed on the slat 10 from rubbing against the metal channel member 20.

Thus, the present invention provides a load-bearing slat of a luggage rack which is designed to prevent vertical displacement of the rub strip relative to the channel member even under extreme loads. Because of the horizontal engagement between the retaining shoulders 36 and the grooves 48 of the rub strip 34, the rub strip 34 is locked within the channel member 20. Furthermore, by forming the channel member such that the inwardly extending flanges 40 engage the rub strip 34 at a lower position towards the bottom of the side walls of the rub strip, displacement of the rub strip 34 is further prevented by the frictional engagement of the retaining shoulders 36 against the sides of the rub strip 34. In addition, any edges of the channel member 20 are prevented from contacting the cargo load by extending the upper portion of the rub strip 34 outwardly above the downwardly curvatured side walls 28 to cover the retaining shoulders 36. The groove 48 is also disposed below the top of the channel member 20 which prevents the rub strip 34 from being inadvertently lifted from between the retaining shoulders 36 since the rub strip 34 is engaged at a lower position and the tendency for the channel member 20 to spread or open to release the rub strip 34 is reduced. Thus, multiple means are provided for retaining the rub strip 34 within the channel member thereby preventing displacement while also ensuring that contact between the luggage cargo and the metal portion of the channel member 20 is prevented.

The foregoing detailed description has been given for clearness of understanding only and no unnecessary limitations should be understood therefrom as some modifications will be obvious to those skilled in the art without departing from the scope of the appended claims.

I claim:

1. A load-bearing slat for a surface mounted vehicle luggage carriage, said slat comprising:
    an elongated channel member mounted to the vehicle surface, said channel member having a pair of side walls defining a top opening, said side walls including integrally formed retaining shoulders disposed inwardly from said side walls into said top opening, said shoulders including a first portion extending substantially downwardly from the top of said side wall and a second portion extending substantially inwardly and formed at an angle to said first portion; and an elongated rub strip having opposite sides and fixedly retained within said top opening of said channel member between said retaining shoulders, said inwardly disposed retaining shoulders engaging said sides of said rub strip to thereby prevent vertical displacement of said rub strip relative to said opening of said channel member.

2. The slat as defined in claim 1 wherein said retaining shoulders are substantially L-shaped, said first portion extending vertically downward from the top of said side wall and said second portion disposed inwardly perpendicular to said depending portion.

3. The slat as defined in claim 1 wherein said rub strip includes an upper portion and a lower portion, said lower portion having a tapered cross-section to facilitate insertion of said rub strip between said retaining shoulders into said top opening of said channel member and said upper portion extending above said side walls of said channel member to form a load-bearing surface of said slat.

4. The slat as defined in claim 1 wherein said channel member includes means for mounting said channel member to the vehicle surface, said means disposed within said channel member beneath said rub strip, said rub strip concealing said mounting means.

5. The slat as defined in claim 1 wherein said rub strip includes opposing grooves extending substantially the length of said strip, said grooves having a substantially rectangular cross-section.

6. The slat as defined in claim 5 wherein said grooves receive said inwardly extending flange portion of said retaining shoulders to fixedly retain said rub strip within said top opening between said retaining shoulders.

7. A load-bearing slat for a surface mounted vehicle luggage carrier, said slat comprising:
   an elongated channel member mounted to the vehicle surface, said channel member having a pair of side walls defining a top opening, said walls including integrally formed retaining shoulders disposed inwardly from the top of said side walls into said top opening; and
   an elongated rub strip having an upper portion, a lower portion and side walls extending therebetween, said rub strip fixedly retained within said top opening of said channel member between said retaining shoulders, and including horizontal grooves extending substantially the length of said rub strip;
   said retaining shoulders having a substantially L-shaped cross-sectional configuration forming an integral extension of said side walls and comprising a downwardly depending portion extending substantially vertically downward from the top of said side wall inwardly of said side wall and a flange portion extending horizontally inwardly parallel to said vehicle surface from said depending portion wherein said flange portion of said retaining shoulders extends into said horizontal groove of said rub strip and said downwardly depending portion of said retaining shoulders frictionally engage said side walls of said rub strip to fixedly retain said rub strip thereby preventing vertical displacement of said rub strip relative to said top opening of said channel member.

8. The slat as defined in claim 7 wherein said lower portion of said rub strip has a tapered cross-section to facilitate insertion of said rub strip between said retaining shoulders and said upper portion extending above said side walls of said channel member to form the load-bearing surface of said slat.

9. The slat as defined in claim 7 wherein said channel member includes means for mounting said channel member to the vehicle surface, said means disposed within said channel member and concealed by said rub strip.

10. A load-bearing slat for a surface mounted vehicle luggage carrier, said slat comprising:
   an elongated channel member having a pair of side walls defining a top opening, said side walls including integral retaining shoulders disposed inwardly of said side walls and extending into said top opening;
   an elongated rub strip having an upper portion, a lower portion having a tapered cross-sectional configuration, and vertical side walls extending therebetween, said rub strip fixedly retained within said top opening of said channel member between said retaining shoulders and including opposing horizontal grooves formed in said side walls and extending substantially the length of said rub strip; and
   means for mounting said channel member to the vehicle surface, said means disposed within said channel member beneath said rub strip, said rub strip concealing said mounting means;
   said retaining shoulders having a substantially L-shaped cross-section configuration forming an integral extension of said side walls and comprising a vertically depending portion extending downward from the top of said side wall and a flange portion extending horizontally inwardly from said depending portion wherein said flange portion of said retaining shoulders extends into said groove of said rub strip and said downwardly depending portion of said retaining shoulders frictionally engage said side walls of said rub strip to fixedly retain said rub strip thereby preventing vertical displacement of said rub strip relative to said top opening of said channel member.

* * * * *